(12) United States Patent
Salvia, III et al.

(10) Patent No.: US 10,290,984 B2
(45) Date of Patent: May 14, 2019

(54) VEHICLE SEAT WITH RETRACTABLE ELECTRICAL CONNECTIVITY DEVICE

(71) Applicant: Toyota Motor Engineering & Manufacturing North America, Inc., Erlanger, KY (US)

(72) Inventors: John J. Salvia, III, Ann Arbor, MI (US); Christopher M. Vargo, Plymouth, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 214 days.

(21) Appl. No.: 15/284,279

(22) Filed: Oct. 3, 2016

(65) Prior Publication Data

US 2018/0097321 A1   Apr. 5, 2018

(51) Int. Cl.
*A47C 7/62* (2006.01)
*H01R 24/76* (2011.01)
*B60N 2/90* (2018.01)
*H01R 27/02* (2006.01)

(52) U.S. Cl.
CPC ............... *H01R 24/76* (2013.01); *B60N 2/90* (2018.02); *H01R 27/02* (2013.01); *H01R 2201/26* (2013.01)

(58) Field of Classification Search
CPC .......... B60R 16/03; B60N 2/879; B60N 3/00; B60N 99/00; A47C 7/72
USPC ................................. 297/217.3, 217.7, 217.1
See application file for complete search history.

(56) References Cited

U.S. PATENT DOCUMENTS

| | | | | |
|---|---|---|---|---|
| 4,850,645 A * | 7/1989 | Crockett | ................. | A61G 5/14 297/330 |
| 6,179,381 B1 * | 1/2001 | Gevaert | ................. | A47C 7/72 297/217.3 |
| 6,683,394 B1 * | 1/2004 | Gevaert | ................. | A47C 1/12 174/480 |
| 7,334,839 B1 * | 2/2008 | Malerba | ................. | B60N 2/002 297/217.1 |
| 9,150,171 B2 | 10/2015 | Kim et al. | | |
| 9,693,631 B2 * | 7/2017 | Jacobs | ................. | A47C 1/126 |
| 9,808,085 B1 * | 11/2017 | Jacobs | ................. | A47C 1/121 |
| 2009/0001775 A1 * | 1/2009 | Smith | ................. | A47B 83/02 297/135 |
| 2009/0152915 A1 * | 6/2009 | Krasna | ................. | A47C 1/0342 297/217.3 |
| 2011/0193372 A1 * | 8/2011 | Pizzuto | ................. | A47C 1/143 297/16.1 |
| 2012/0062011 A1 * | 3/2012 | Jones | ................. | A61G 15/02 297/362.11 |
| 2012/0133182 A1 * | 5/2012 | Chiu | ................. | A47C 4/54 297/232 |

(Continued)

OTHER PUBLICATIONS

Altinex, "ConferenceRoomAV", Retrieved from the Internet: <https://www.conferenceroomay.com/Altinex-/TNP355C.cfm>, Retrieved Jul. 6, 2016, 1 page.

(Continued)

*Primary Examiner* — Chi Q Nguyen
(74) *Attorney, Agent, or Firm* — Christopher G. Darrow; Darrow Mustafa PC (57) ABSTRACT

A vehicle seat includes a seat base and a retractable electrical connectivity device mounted to the seat base. The electrical connectivity device may be mounted in a receptacle incorporated into the seat base.

15 Claims, 5 Drawing Sheets

(56) References Cited

U.S. PATENT DOCUMENTS

2013/0264851 A1* 10/2013 Kim .................. B60R 16/03
 297/217.3
2014/0175847 A1* 6/2014 Schurg ................ B64D 11/06
 297/188.07

OTHER PUBLICATIONS

Ebay, "Pulling Pop Up Power Socket, 4 US Plugs & 2 USB Ports Tabletop Safe Hidden with", Retrieved from the Internet: <http://www.ebay.com/itm/Pulling-Pop-Up-Power-Socket-4-US-Plugs-2-USB-Ports-Tabletop-Safe-Hidden-with/142013757166?_trksid=p2141725.c100338.m3726&_trkparms=aid%3D222007%26algo%3DSIC.MBE%26ao%3D1%26asc%3D20150313114020%26meid%3Dc9ea4fae1cdb4c5386c350fc9c788fba%26pid%3D100338%26rk%3D1%26rkt%3D17%26sd%3D162020550093>, Retrieved Jul. 6, 2016, 2 pages.

* cited by examiner

VEHICLE SEAT WITH RETRACTABLE ELECTRICAL CONNECTIVITY DEVICE

TECHNICAL FIELD

The embodiments described herein relate to vehicle seats and, more particularly, to a vehicle seat having features structured to enable electrical connections between various user devices, and between the user devices and vehicle systems.

BACKGROUND

Electrical connectivity devices such as USB ports and AC power outlets may be incorporated into a vehicle interior, for the convenience of vehicle occupants. However, it may be difficult to position such devices for convenient access to the devices and unimpeded access to seatbelt buckles or anchor wires of the child-seat anchor wires, and also so as to prevent dirt, liquid spillage and other foreign matter from contaminating the devices when they are not in use.

SUMMARY

In one aspect of the embodiments described herein, a vehicle seat is provided. The vehicle seat includes a seat base and a retractable electrical connectivity device mounted to the seat base.

In another aspect of the embodiments described herein, a vehicle seat is provided. The vehicle seat includes a seat base and a retractable electrical connectivity device mounted to the seat base. The electrical connectivity device is movable between a retracted position and a deployed position. The electrical connectivity device is structured and mounted to the seat base such that an uppermost portion of the electrical connectivity device resides below an upper edge of a side of the seat base along which the electrical connectivity device is mounted, when the electrical connectivity device is in the retracted position.

In another aspect of the embodiments described herein, an electrical connectivity assembly for a vehicle is provided. The electrical connectivity device includes a receptacle structured for attachment to a vehicle seat and an electrical connectivity device movably mounted in the receptacle. The electrical connectivity device is movable between a retracted position and a deployed position.

DETAILED DESCRIPTION

Embodiments described herein relate to a vehicle seat incorporating a retractable electrical connectivity device. The electrical connectivity device may be positioned at a location on the seat so as to minimize interference with a vehicle occupant attempting to enter or leave the seat, and so as to minimize interference with occupant access to a seatbelt buckle and/or child seat anchor wire. The electrical connectivity device may also be retracted or stowed when not in use, to minimize interference with a vehicle occupant attempting to enter or leave the seat. The electrical connectivity device is also deployable, by an occupant seated in the seat, to a use position.

Description follows regarding a vehicle seat according to an exemplary embodiment of the present invention with reference to FIGS. 1-6. Note that in the following description, the front, back, left, right, up and down directions used in the description respectively indicate the front, back, left, right, up and down directions from the viewpoint of an occupant seated in the vehicle seat when mounted in a vehicle.

Figure 1:
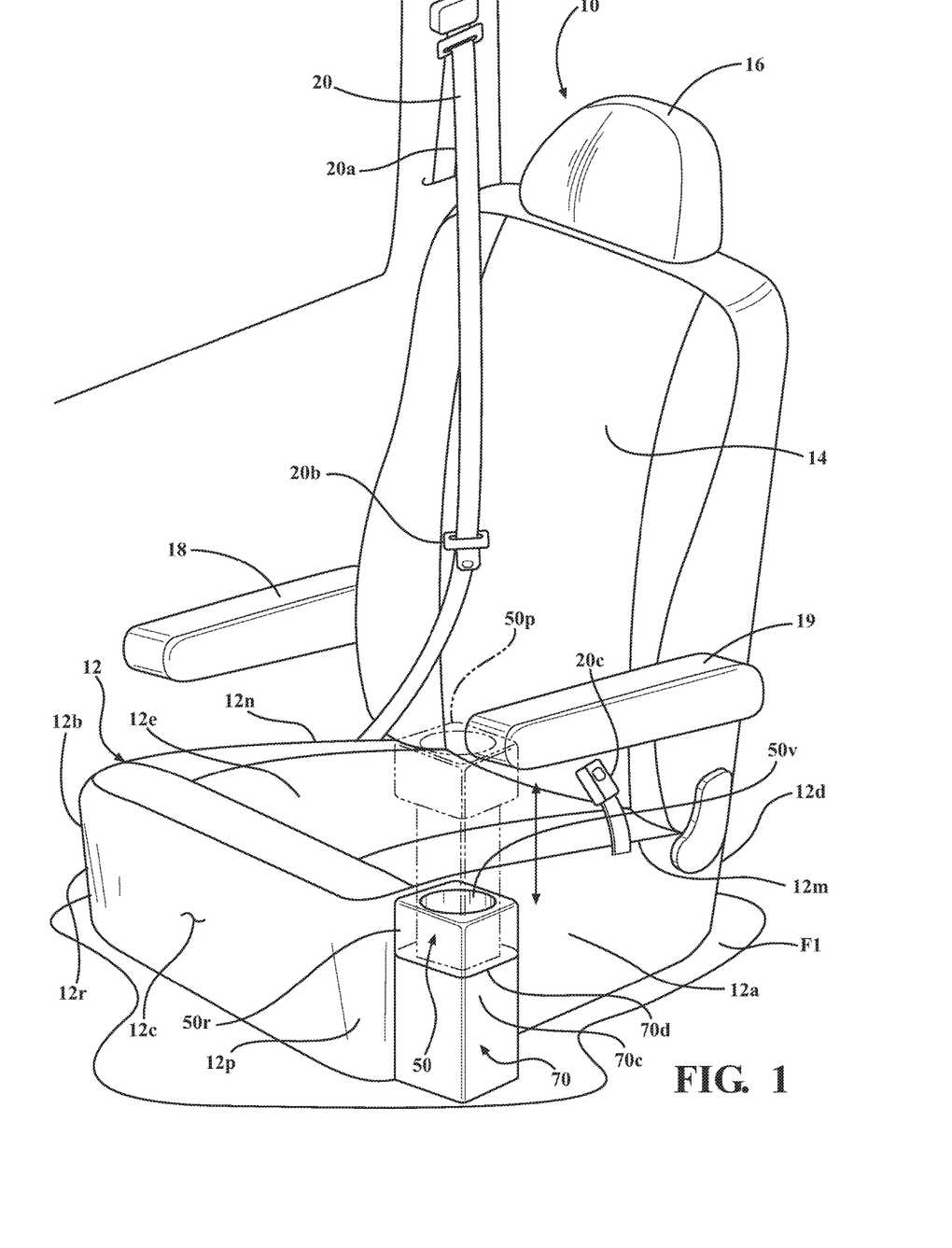
FIG. 1 is a perspective view of a vehicle seat including an electrical connectivity device in accordance with an embodiment described herein, shown in a retracted condition, and with a deployed condition of the electrical connectivity device shown in phantom.

As shown in FIG. 1, a vehicle seat 10 according to one exemplary embodiment is a rear passenger's seat disposed behind the front seats (i.e., driver's seat and front passenger seat) of a vehicle (not shown), for example, a minivan. In the embodiment shown, the vehicle seat 10 includes a seat base 12 structured for supporting the buttocks and thighs of the seat occupant, a seat back 14 that supports the upper body of the occupant, and a headrest 16 that supports the head of the occupant. The vehicle seat 10 may also be equipped with a pair of armrests 18 and 19. Each of the seat back 14 and headrest 16 may be covered with a pad formed from urethane foam or any other suitable cushioning material.

Seat base 12 has a left side 12a, a right side 12b, a front side 12c, and a rear side 12d. The front side 12c of the seat base 12 is considered to be a side along which a seat occupant's legs extend when the occupant is seated during normal usage of the seat, as seen in FIG. 1. Seat base 12 also has a top surface 12e which may be structured for supporting the buttocks and thighs of the seat occupant. In certain embodiments, the seat base top surface 12e may be formed (or partially formed) by a seat cushion attached to the seat base. The seat cushion may be formed from any suitable material (for example, a urethane foam). The seat cushion may be covered by a covering material formed using, for example, fabric or leather. In the embodiments shown, the seat base 12 is configured for attachment to a floor F1 of the vehicle so as to enable the seat 10 to swivel. Alternatively, the seat 10 may be attached to the floor F1 using, for example, conventional rails which permit the seat base 12 to be moved forwardly and rearwardly.

Figure 6:
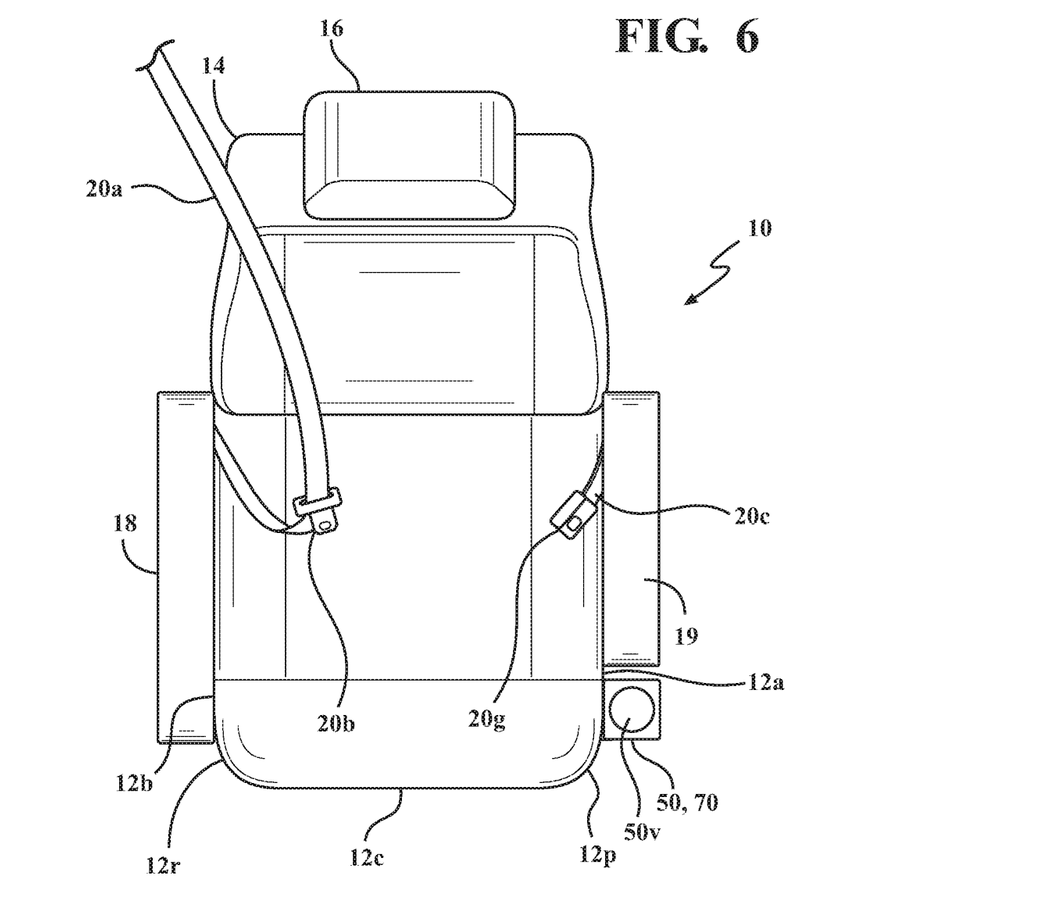
FIG. 6 is a plan view of the vehicle seat embodiment shown in FIG. 2.

Referring to FIGS. 1 and 6, a corner of the seat base may be defined by an intersection of two adjacent sides of the seat base. Thus, for example, a left front corner 12p of the seat base 12 may be defined by an intersection of the seat base left side 12a and the front side 12c. A right front corner 12r of the seat base 12 may be defined by an intersection of the seat base right side 12b and the front side 12c. Thus, front corners 12p and 12r of the seat base are corners partially defined by seat base front side 12c.

As previously mentioned, an armrest may be positioned along each side of the seat 10. In the embodiment shown, an armrest 18 is positioned along a first or right side of the seat, and an armrest 19 is positioned along a second or left side of the seat. Each of armrests 18 and 19 may be rotatably attached to an associated side of seat back 14 in a known manner so that the armrests are rotatable between "down" or use positions (shown in FIG. 1), and "up" or stowed positions (not shown).

Figure 2:
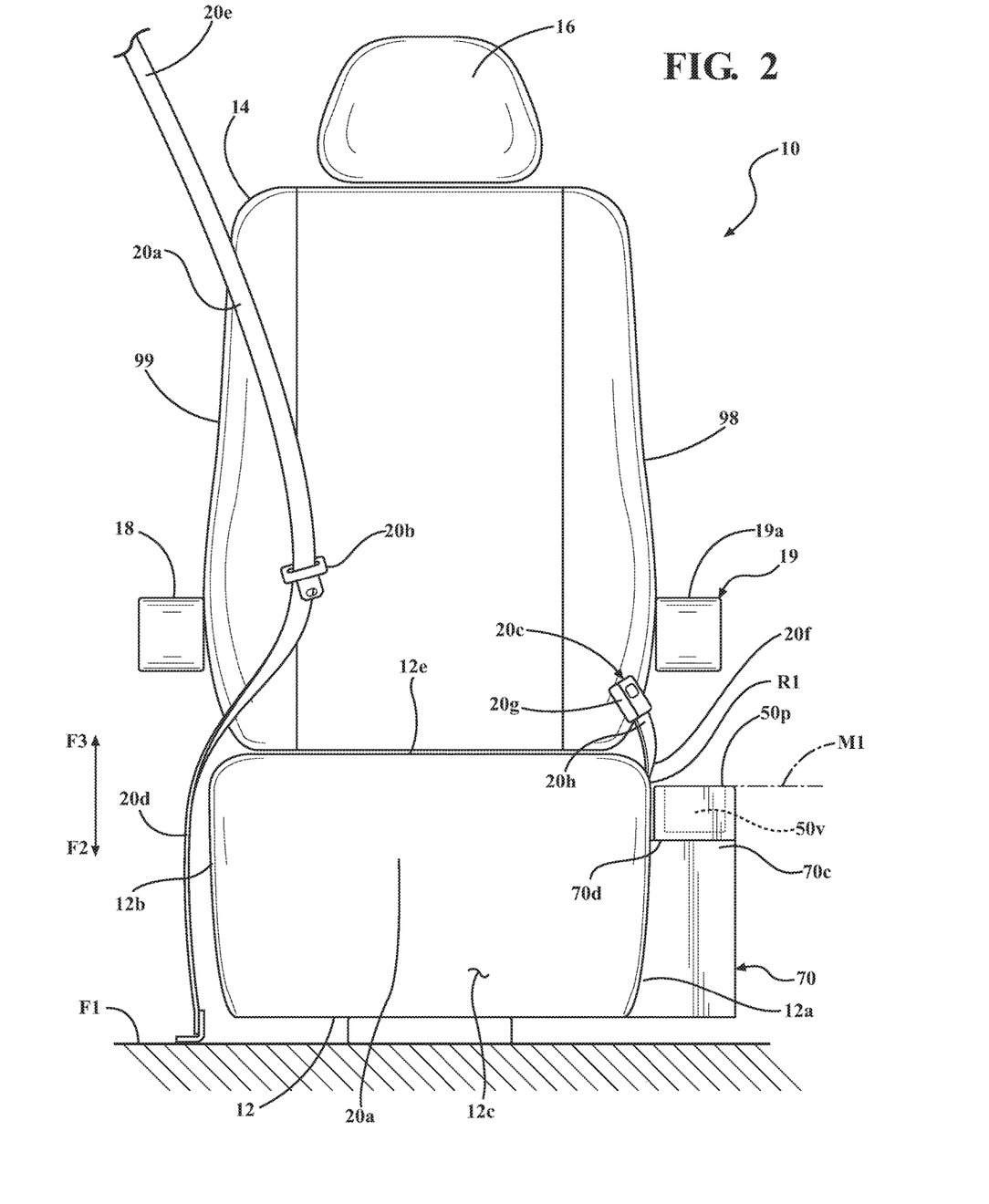
FIG. 2 is a front view of the seat shown in FIG. 1.

Referring to FIGS. 1 and 2, a seatbelt 20 may be provided for securing the seat occupant in the seat during operation of the vehicle. Seatbelt 20 may be coupled to the seat 10 by attachment to the seat 10 and/or to other portions of the vehicle in a known manner. Seatbelt 20 may include a main or belt portion 20a including a clasp 20b, and a buckle portion 20c. In the embodiment shown, the belt portion 20a is attached to the vehicle so that it resides along a right side 99 of the seat when the seatbelt 20 is in an unbuckled condition. The buckle portion 20c is attached to the vehicle so that it resides along a left side 98 of the seat when the seatbelt 20 is in an unbuckled condition. One end 20d of the belt portion 20a may be attached to the seat 10 or to another portion of the vehicle (such as an anchor secured to a floor of the vehicle) adjacent the seat base 12. Another end 20e of the belt portion may pass through (or be supported along) an interior trim wall, the vehicle B-pillar, a door frame, another part of the vehicle adjacent the seat 10, or to the frame structure of the seat itself, and may be connected to a known seatbelt retraction mechanism (not shown).

One end 20f of the buckle portion 20c may be attached to the seat base 12 or to the seat 10 along a seam between the seat base 12 and the seat back 14. Alternatively, the end 20f of the buckle portion 20c may be secured to another portion of the seat 10 or to another portion of the vehicle adjacent the seat. Another end 20h of the buckle portion has a buckle 20g attached thereto. The buckle portion 20c is secured to the vehicle so that the buckle 20g resides proximate the side 98 of the seat opposite the side 99 along which the belt portion 20a is secured. Buckle 20g is structured for engaging clasp 20b in a known manner to secure the seatbelt in a buckled condition, thereby securing the occupant in the seat during vehicle operation. To buckle the seatbelt, the clasp 20b of the belt portion 20a is brought from the first side 99 of the seat 10 across the torso of a seated occupant toward the second, or buckle, side 98 of the seat, and is then attached to buckle 20g to secure the occupant in the seat.

Since the belt portion 20c of a given seatbelt may be supported by the vehicle, the side of the seat 10 along which the belt portion is supported may vary with the location of the seat 10 inside the vehicle. For example, the seat 10 shown in FIGS. 1 and 2 is configured to be positioned along a right side of the vehicle interior. Thus, the side along which the belt portion 20a is supported may be the right side 99 of the seat, and the side of the seat along which the buckle portion 20c resides is the left side 98 of the seat. Conversely, when the seat 10 is located along a left side of the vehicle, the side along which the belt portion 20a is supported may be the left side 98 of the seat, and the side of the seat along which the buckle portion 20c resides is the right side 99 of the seat.

Referring to FIGS. 1-6, a retractable electrical connectivity device 50 may be mounted to the seat base 12. The electrical connectivity device 50 may include a housing 50h in which is mounted at least one electrical coupling mechanism configured for electrically coupling or connecting a user electrical device (not shown) to a device incorporated into the vehicle, for various purposes. For example, electrical connectivity device 50 may be configured for electrical coupling to an electrical power source (such as a vehicle battery, for example) (not shown) in the vehicle. The device 50 may include at least one electrical coupling mechanism configured for electrically coupling or connecting an electrical device to the vehicle electrical power source. This enables one or more electrical devices (such as computers, audio players, etc.) to be recharged and/or powered by the vehicle when the vehicle is in use.

Figure 4:
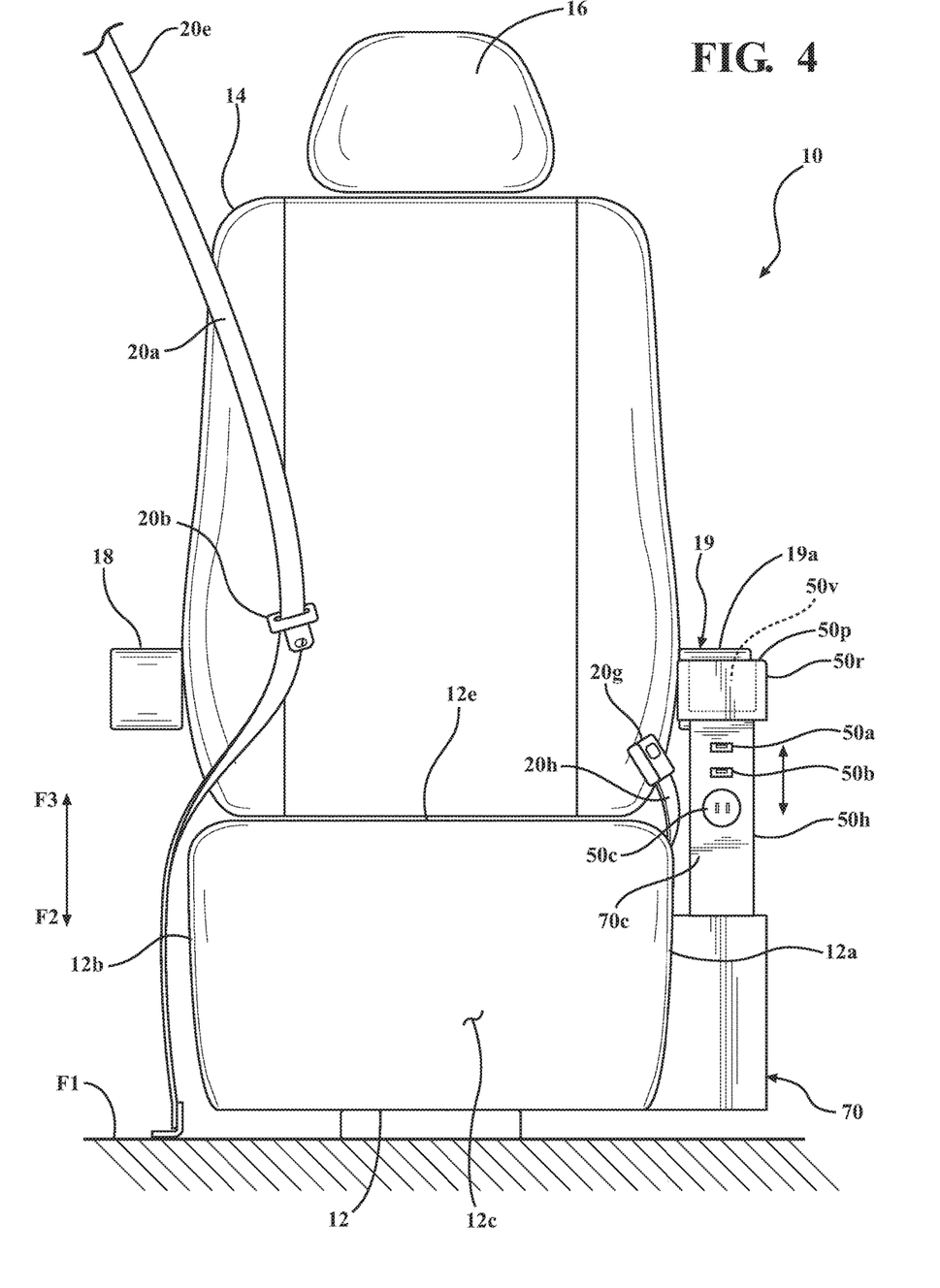
FIG. 4 is the front view of FIG. 1 showing the electrical connectivity device in a deployed condition.
Figure 5:
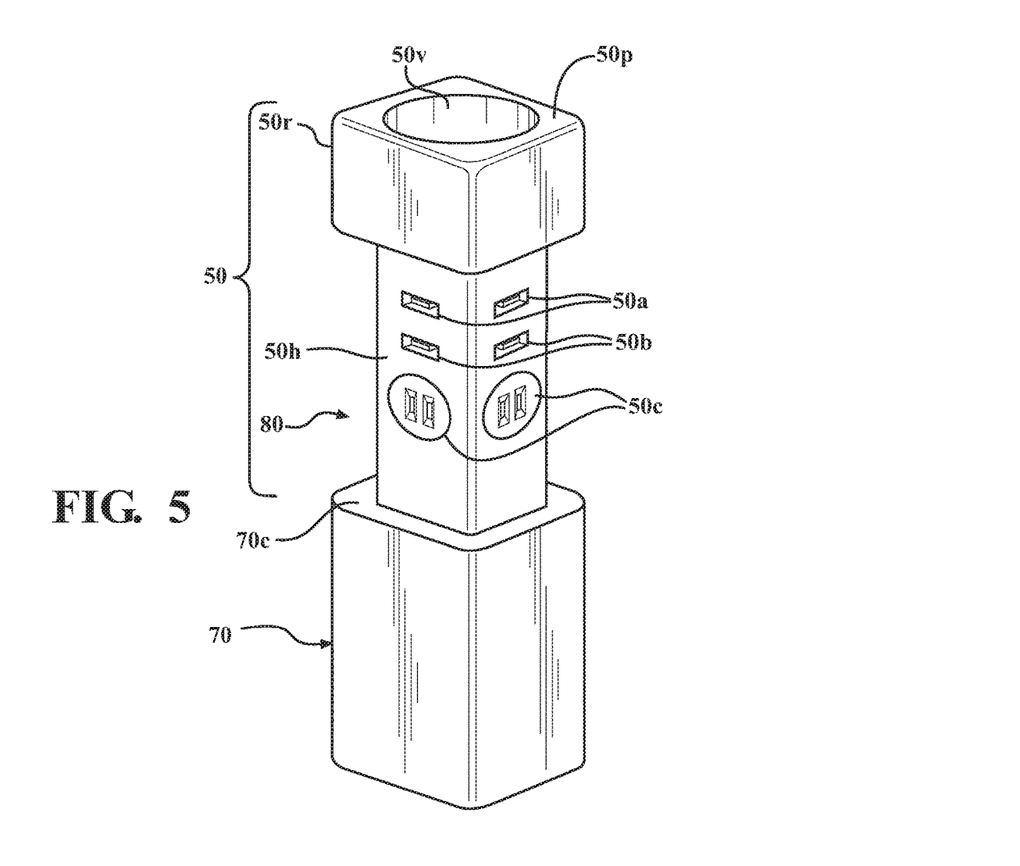
FIG. 5 is a perspective view of an electrical connectivity assembly incorporating an electrical connectivity device in accordance with an embodiment described herein.

In certain embodiments, the electrical coupling mechanism may be a USB connector, such as USB connectors 50a and 50b shown in FIGS. 4 and 5. Note that USB is an abbreviated term for a Universal Serial Bus that is a serial bus standard used to connect peripheral devices to a computer. In certain embodiments, the electrical coupling mechanism may be an alternating current (AC) socket, such as sockets 50c shown in FIGS. 4 and 5. Any of a variety of other coupling mechanisms may also be used.

The electrical connectivity device 50 may also include at least one electrical coupling mechanism configured for electrically coupling or connecting a first electrical device (not shown) to at least a second electrical device (not shown). In particular embodiments, one of the first electrical device and the second electrical device may be a device which is incorporated into the vehicle. Thus, the electrical coupling mechanism may enable the transfer of signals and/or power between the first device and one or more additional devices. For example, the first electrical device may be a cellular device and the second electrical device may be a vehicle entertainment system (not shown). The electrical coupling mechanism may be a USB connector (such as USB connectors 50a and 50b shown in FIGS. 4 and 5) accessible for electrical coupling or connection with the cellular device, and also communicatively coupled to the vehicle entertainment system. In one particular example, the electrical connectivity device may enable the cellular device to transmit music from the cellular device to the vehicle speaker system and, thus, throughout the vehicle passenger compartment.

In particular embodiments, the electrical connectivity device 50 may include a plurality of electrical coupling mechanisms configured for electrically coupling a first electrical device (not shown) electrically connected to a first electrical coupling mechanism to a second electrical device (not shown) electrically connected to a second electrical coupling mechanism. For example, each of first and second electrical devices may be plugged into an associated first and second USB connectors (for example, ones of connectors 50a and 50b of FIGS. 4 and 5) incorporated into the electrical connectivity device. The first and second USB connectors may be electrically coupled to each other so as to enable the first and second electrical devices to electronically communicate, for example, for purposes of data or other information transfer between the first and second devices. In this arrangement, the electrical connectivity device may function as a USB hub.

The electrical connectivity device 50 is retractable in that it is movable between a stowed or retracted position (for example, as shown in FIG. 2) in which the electrical coupling mechanism(s) are not positioned or accessible for electrical connection of an associated electrical device thereto, and an extended or deployed position (for example, as shown in FIG. 4) in which the electrical coupling mechanism(s) (such as coupling mechanism 50a and mechanism 50c as shown in FIGS. 4 and 5) are positioned or accessible for electrical connection of at least one electrical device thereto. The electrical connectivity device 50 is structured to be movable between the retracted position and the deployed position responsive to actuation by a user, as described herein.

The electrical connectivity device 50 may also include a cap 50r securable to an end of the housing 50h. In certain embodiments, an uppermost surface of the cap may form an uppermost portion 50p of the electrical connectivity device. In certain embodiments, a beverage holder 50v may be formed in an uppermost portion 50p of the electrical connectivity device, for example, in cap 50r. As shown in FIG. 4, when the electrical connectivity device is deployed, the connectivity device uppermost portion into which the beverage holder 50v is formed may reside at or slightly below a level of an arm-resting surface 19a of an armrest 19 positioned along a side of the seat 10 on which the electrical connectivity device is mounted.

The electrical connectivity device 50 may be structured and mounted to the seat base 12 so as to enable convenient access to a seatbelt buckle and/or a child-seat anchor wire connected to the seat to which the electrical connectivity device is attached, when the electrical connectivity device is in its retracted position. In addition, the electrical connectivity device 50 may be structured and mounted to the seat base 12 such that an occupant will not be obstructed from entering and leaving the seat by the electrical connectivity device when the electrical connectivity device is in its retracted position.

To help eliminate or limit obstructions to both seatbelt buckle/child-seat anchor wire access and access to the seat 10 by an occupant, the electrical connectivity device 50 may be structured and mounted to the seat base 12 along one of sides 12a, 12b, or 12c of the seat base 12 such that an uppermost portion 50p of the electrical connectivity device 50 resides below an upper edge of the side of the seat base 12 along which the electrical connectivity device 50 is mounted, when the electrical connectivity device 50 is in the retracted position.

For example, in seat embodiments such as the embodiment shown in FIGS. 1 and 2 where a radius R1 is formed at an intersection between the seat base top surface 12e and a side 12a of the seat base, the level at or below which the uppermost portion 50p of the electrical connectivity device 50 is to be located when the device 50 is retracted may be designated by the line M1 formed by the intersection between the seat base side 12a and an end of the radius R1.

Figure 3:
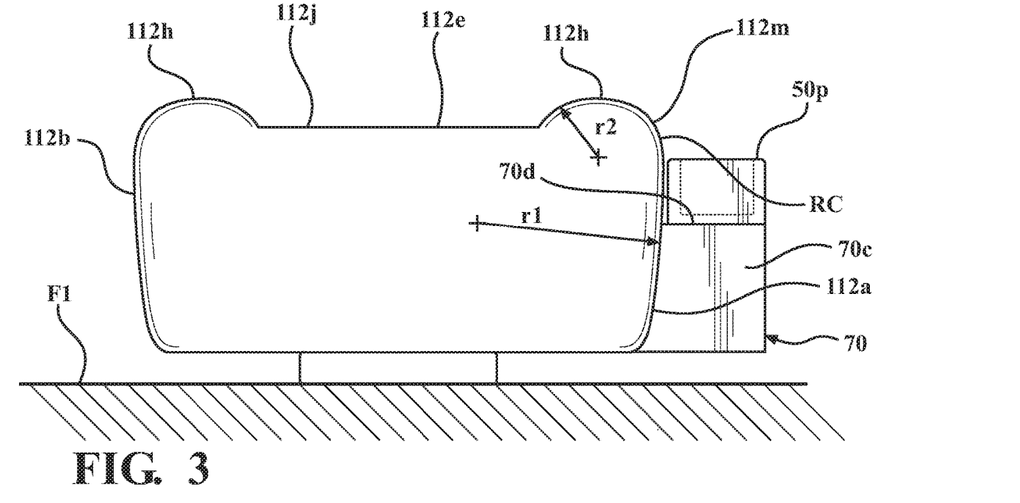
FIG. 3 is a front view of a seat base which may be incorporated into an alternative embodiment of a vehicle seat.

Referring to FIG. 3, in certain embodiments, a top surface 112e of the seat base 112 may include a relatively higher bolster 112h adjacent each of sides 112a and 112b, with a relatively lower central portion 112j positioned between the bolsters 112h. The bolsters 112h may each have a radius of curvature r2. In addition, each of sides 112a and 112b may have a radius of curvature r1. In this embodiment, the line below which the uppermost portion 50p of the electrical connectivity device 50 is to be located may be designated by a line RC extending along (and formed by) the intersection between the radii r1 and r2.

In the arrangements described above and in other embodiments described herein, no part of the electrical connectivity device 50 will extend to or above a part of the top surface 12e of the seat 10 adjacent the electrical connectivity device 50 when the electrical connectivity device is in its retracted position. The ability to position the electrical connectivity device uppermost portion 50p below the level of the top surface 12e of the seat base 12 when the electrical connectivity device 50 is retracted may help prevent the electrical connectivity device from interfering with access to the seatbelt buckle 20g and/or movement of an occupant into and out of the seat 10.

In certain embodiments, and as shown in FIGS. 1-4 and 6, the electrical connectivity device 50 may be mounted to the seat base 12 along the side of the seat on which the belt buckle portion 20c resides. This side of the seat base will be an inboard side of the seat base (i.e., a side of the seat base facing in a direction toward the vehicle interior) for seat embodiments described herein. Mounting of the electrical connectivity device 50 to an inboard side of the seat base aids in preventing crowding of the electrical connectivity device 50 between the seat base and a side door or wall of the vehicle interior, thereby allowing more space for access of the electrical connectivity device. However, the electrical connectivity device 50 may be mounted along either of sides 12a or 12b of the seat base 12.

Also, in certain embodiments, the electrical connectivity device 50 may be mounted along a side of the seat base 12 in a position designed to be spaced as far apart as possible from the seat belt buckle portion 20c or child-seat anchor wire (not shown), to help eliminate or limit interference with access to the buckle or child seat anchor wire. For example, in certain embodiments, and as shown in FIGS. 1-4 and 6, the electrical connectivity device may be mounted to the seat base 12 at a front corner (for example, one of front corners 12r or 12p) of the seat base. In the particular embodiment shown in FIGS. 1-4 and 6, the electrical connectivity device 50 is mounted to the seat base 12 along the side of the seat on which the belt buckle portion resides, and at a left front corner 12p of the seat base.

Referring to FIGS. 1-6, in certain embodiments, the seat base 12 includes a receptacle 70 structured for receiving and mounting the electrical connectivity device 50 therein. The receptacle 70 may be oriented generally vertically as shown in FIGS. 1-6 so that the electrical connectivity device 50 may be raised from and lowered into the receptacle. The electrical connectivity device 50 may be mounted in the receptacle 70 so as to be movable between retracted (FIG. 2) and deployed (FIG. 4) positions. Thus, in the embodiment shown in FIGS. 2 and 4, the retracted position of the electrical connectivity device 50 is a "lowered" position, and the deployed position of the electrical connectivity device 50 is a "raised" position.

In certain embodiments, as shown in FIGS. 1-4 and 6, the receptacle 70 is positioned along a side of the seat 10 on which the buckle portion 20c of the seatbelt resides when it is in an unbuckled condition. Alternatively, the receptacle 70 may be positioned along a side of the seat 10 on which the belt portion 20a of the seatbelt resides when it is in an unbuckled condition.

In certain embodiments, and as shown in FIGS. 1-4 and 6, the receptacle may be positioned at a front corner of the seat base. In the particular embodiment shown in FIGS. 1-4 and 6, the receptacle is positioned along the side of the seat on which the belt buckle portion 20c resides, and at a left front corner 12p of the seat base.

Although the electrical connectivity device 50 in the embodiments described herein is shown mounted in a receptacle 70 coupled to the seat base, mechanisms other than the receptacle 70 may be used to mount the electrical connectivity device to the seat base 12, if desired.

The receptacle 70 may be integrally formed with another portion of the seat base 12. Alternatively, the receptacle 70 may be formed separately from a remainder of the seat base 12 and attached to the remainder of the seat base 12 using any suitable method, for example, welding, adhesive application, fasteners, etc.

In combination, the receptacle 70 and the electrical connectivity device 50 may form an electrical connectivity assembly 80 configured for attachment to the remainder of the seat base 12.

Referring to FIGS. 1-4 and 6, the electrical connectivity device cap 50r may be structured to blend or mate with an upper end 70c of the receptacle from which the electrical connectivity device extends when deployed. This arrangement may form a smooth seam 70d between the cap 50r and the receptacle 70 when the electrical connectivity device 50 is retracted into the receptacle 70 as shown in FIGS. 1 and 2, thereby enhancing the overall appearance of the cap-receptacle combination.

To move the electrical connectivity device 50 between the deployed and retracted positions, any of a variety of mechanisms may be employed. In one example, the electrical connectivity assembly 80 (i.e., the electrical connectivity device 50 and receptacle 70) may be structured to enable a user to move the electrical connectivity device 50 to the deployed position by grasping the cap 50r and exerting an upward force (in direction F3 of FIG. 2) on the electrical connectivity device 50, to pull the device 50 into the deployed position. The user may then stow the electrical connectivity device 50 by pressing on the cap 50r in direction F2 of FIG. 2.

In another embodiment, the electrical connectivity device 50 may be operatively coupled to the receptacle 70 by a spring-actuated toggle mechanism (not shown) positioned inside the receptacle 70. In one mode of operation, a user presses downwardly (in direction F2 of FIG. 2) on cap 50r, releasing a latch or catch retaining the electrical connectivity device 50 in the retracted position, and enabling a spring to push the electrical connectivity device 50 upwardly into the deployed position, at which time a hard stop (not shown) may engage the electrical connectivity device 50 to prevent further upward movement. To return the electrical connectivity device 50 to the retracted position, the user may press downwardly on the cap 50r to force the electrical connectivity device 50 back into the receptacle 70, until the latch re-engages the electrical connectivity device 50 to retain it in the retracted position. Any of a variety of alternative electrical connectivity device actuation mechanisms may be employed.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle seat comprising:
a vehicle seat base; and
a retractable electrical connectivity device mounted to the vehicle seat base, wherein the retractable electrical connectivity device is movable between a deployed position in which an uppermost portion of the retractable electrical connectivity device resides above a surface of the vehicle seat base structured for supporting buttocks and thighs of a seat occupant, and a retracted position in which the uppermost portion of the retractable electrical connectivity device resides below the surface of the vehicle seat base.

2. The vehicle seat of claim 1 wherein the retractable electrical connectivity device includes at least one electrical coupling mechanism configured for electrically coupling a first electrical device to at least a second electrical device.

3. The vehicle seat of claim 2 wherein the retractable electrical connectivity device is configured to be electrically coupled to an electrical power source, and wherein the at least one electrical coupling mechanism is configured for electrically coupling the first electrical device to the power source for use in powering the electrical device.

4. The vehicle seat of claim 2, wherein the vehicle seat is positioned in a vehicle, and wherein one of the first electrical device and the at least a second electrical device is a device incorporated into the vehicle and electrically coupled to the retractable electrical connectivity device.

5. The vehicle seat of claim 2 wherein the retractable electrical connectivity device includes a plurality of electrical coupling mechanisms configured for electrically coupling the first electrical device electrically connected to a first electrical coupling mechanism of the plurality of electrical coupling mechanisms, to the at least a second electrical device electrically connected to a second electrical coupling mechanism of the plurality of electrical coupling mechanisms.

6. The vehicle seat of claim 2 wherein the retractable electrical connectivity device is movable between a retracted position in which the at least one electrical coupling mechanism is not positioned for electrical connection of the first electrical device or the at least a second electrical device thereto, and a deployed position in which the at least one electrical coupling mechanism is positioned for electrical connection of the first electrical device or the at least a second electrical device thereto.

7. The vehicle seat of claim 2 wherein the at least one electrical coupling mechanism comprises a USB connector.

8. The vehicle seat of claim 2 wherein the at least one electrical coupling mechanism comprises an alternating current (AC) socket.

9. The vehicle seat of claim 1 wherein a seatbelt is coupled to the seat, the seatbelt including a belt portion extending from a first side of the seat, and a buckle portion extending from a second side of the seat opposite the first side, and wherein the retractable electrical connectivity device is mounted to the vehicle seat base along the second side of the seat.

10. The vehicle seat of claim 9 wherein the retractable electrical connectivity device is mounted to the vehicle seat base at a front corner of the vehicle seat base.

11. The vehicle seat of claim 1 wherein the vehicle seat base includes a receptacle structured for mounting the retractable electrical connectivity device therein, and wherein the retractable electrical connectivity device is movably mounted in the receptacle.

12. The vehicle seat of claim 11 wherein the receptacle is formed separately from a remainder of the vehicle seat base and attached to the vehicle seat base.

13. A vehicle seat comprising:
a vehicle seat base; and
a retractable electrical connectivity device mounted to the vehicle seat base, wherein the vehicle seat base includes a receptacle structured for mounting the retractable electrical connectivity device therein, and wherein the retractable electrical connectivity device is movably mounted in the receptacle, and wherein a seatbelt is coupled to the seat, the seatbelt including a belt portion residing along a first side of the seat when the seatbelt is in an unbuckled condition, and a buckle portion residing along a second side of the seat opposite the first side when the seatbelt is in an unbuckled condition, and wherein the receptacle is positioned along the second side of the seat.

14. The vehicle seat of claim 13 wherein the receptacle is positioned at a front corner of the vehicle seat base.

15. A vehicle seat comprising:
a seat base;
a receptacle; and
a retractable electrical connectivity device mounted to the seat base, the retractable electrical connectivity device including at least one electrical coupling mechanism configured for electrically coupling an electrical device to a vehicle electrical power source, the retractable electrical connectivity device being extendable vertically upwardly from the receptacle to enable access to the at least one electrical coupling mechanism, the retractable electrical connectivity device also being retractable vertically downwardly into the receptacle to prevent access to the at least one electrical coupling mechanism.

\* \* \* \* \*